Nov. 5, 1963 A. J. GIGER ET AL 3,109,997

DOUBLE CIRCUIT COAXIAL JACK WITH AUTOMATIC CROSS-CONNECTION UPON PLUG REMOVAL AND AUTOMATIC TERMINATION OF IDLE LINE UPON PLUG INSERTION

Filed July 10, 1961 2 Sheets-Sheet 1

INVENTORS: A. J. GIGER
P. T. HAURY
R.W. McKENZIE
L. F. STAEHLER
BY Harry L. Newman
ATTORNEY INVENTORS: A. J. GIGER
P. T. HAURY
R. W. McKENZIE
L. F. STAEHLER
BY Harry L. Newman
ATTORNEY United States Patent Office 3,109,997

Patented Nov. 5, 1963

3,109,997

DOUBLE CIRCUIT COAXIAL JACK WITH AUTOMATIC CROSS-CONNECTION UPON PLUG REMOVAL AND AUTOMATIC TERMINATION OF IDLE LINE UPON PLUG INSERTION

Adolph J. Giger, Springfield, Paul T. Haury, Berkeley Heights, Roger W. McKenzie, Leonardo, and Lester F. Staehler, Chatham, N.J., assignors to Bell Telephone Laboratories, Incorporated, New York, N.Y., a corporation of New York Filed July 10, 1961, Ser. No. 122,792
10 Claims. (Cl. 333—8)

This invention relates to coaxial connectors and particularly to coaxial connectors of the type known as jacks.

Pairs of coaxial jacks are frequently used in a coaxial transmission system to provide convenient points of entrance into the system. By having the jack pairs connected at appropriate points in the transmission path, with the path coming in on one jack of a pair and going out on the other jack of the pair, the jack pairs facilitate the testing and patching of apparatus and circuits in the system.

Heretofore, continuity in the transmission path from one jack of the pair to the other jack of the pair was achieved by means of a plug pair, the plug pair merely connecting one jack to the other jack. When it was desired to use the jack pair for the purpose of testing or patching the equipment or circuitry associated therewith, it was, of course, necessary to first remove the plug pair from the jack pair before other circuitry, equipment, or terminating plugs could be inserted into the jack pair. If no means were provided for shunting the transmission path around the jack pair, the removal of the plug pair from the jack pair resulted in a several second period during which time the transmission path might be open and service along the path disrupted.

Consequently, to prevent such a disruption from occurring, it was necessary to use multiple jack pairs which were connected in parallel with one another. The plug pair in one pack pair could then be removed, while the plug pair in the parallel jack pair maintained the continuity of the transmission line. After the circuitry equipment, or terminating plugs to be used in the testing or patching of the transmission line were connected into the first jack pair, the plug pair in the parallel jack pair could be removed without producing any undesired disturbances in the transmission path.

Thus the use of plug pairs to provide continuity in the transmission path through the jack pairs resulted in the need for using multiple jack pairs. The multiple jack pairs, besides requiring more space, added to the cost of the equipment and added to the complexity of the testing and patching procedure. In addition, with the use of plug pairs there was always the hazard that when the testing or patching was completed and the circuitry, equipment, or terminating plugs used in the testing or patching removed, the technician might forget to replace the plug pairs and thereby leave the transmission line open.

A general object of the invention is to provide a coaxial jack that eliminates the need both for plug pairs and for multiple jack pairs.

Specifically, an object of this invention is to provide a coaxial jack in which a pair of sockets are electrically connected one to the other when no plugs are inserted in either one of the sockets.

Another object of this invention is to provide a coaxial jack in which the insertion of a single plug into either one of the sockets sequentially connects the plug to the socket into which it is inserted, disconnects the sockets one from the other, and terminates the socket into which no plug is inserted.

Still another object of this invention is to provide a coaxial jack in which the insertion of a plug into the other socket of the pair first connects the plug to the socket and then disconnects the socket from its termination.

A further object of this invention is to provide a coaxial jack in which the above-described internal switching is achieved without affecting the electrical characteristics of the coaxial system in which the jack operates.

These and other objects of the invention are realized in an illustrative embodiment thereof wherein the coaxial jack comprises a pair of sleeve-like outer contact springs supported by a common conductive member in a spaced parallel relationship. Each of the outer contact springs is disposed about and electrically insulated from a sleeve-like inner contact spring, the inner and outer contact springs being coaxial. One end of each set of coaxial contact springs is adapted to be connected to a coaxial cable while the other end is adapted to receive a coaxial plug. A housing encloses the two sets of coaxial contact springs and supports a switching assembly therebetween.

The switching assembly includes a U-shaped wire spring having contacts secured to the ends of the legs thereof. The wire spring normally biases the contacts into engagement with the inner contact springs, and since the outer contact springs are supported by a common conductive member, the wire spring normally completes an electrical connection between the two sets of contact springs and provides continuity to the coaxial circuit in which the jack pair is connected. A single loop in the base of the wire spring introduces a series inductance that compensates for the mismatch between the impedance of the connection and the characteristic impedance of the coaxial circuit in which the jack pair is connected.

The wire spring, in engaging the inner contact springs, extends into the path followed by coaxial plugs when they are inserted into engagement with the sets of contact springs, and when a coaxial plug is inserted into engagement with either set of contact springs, it strikes a dielectric element mounted on a leg of the wire spring and deflects the leg away from its associated inner contact spring, thereby interrupting the connection between the sets of contact springs.

The deflection of the leg brings the contact secured to the end thereof into engagement with a bulb-shaped cantilever spring positioned between the legs and the free end of the cantilever spring is deflected into engagement with the contact on the other leg of the wire spring. The secured end of the bulb-shaped spring is electrically connected through a resistor to the housing of the jack, the housing being at the same potential as the outer contact springs. Thus the coaxial circuit connected to the socket into which no plug is inserted is provided with a termination. The lead of the resistor includes a loop therein that compensates for the mismatch between the impedance of the termination and the characteristic impedance of the coaxial circuit in which the jack is connected.

When plugs are inserted into engagement with both sets of contact springs, the plugs, after making electrical contact with the contact springs, deflect both legs of the wire spring away from the inner contact springs and the switching assembly is electrically disconnected.

A complete understanding of the invention and of these and other features and advantages thereof may be gained from consideration of the following detailed description taken in conjunction with the accompanying drawing wherein one embodiment of the invention is illustrated. It is to be expressly understood, however, that the drawing is for the purposes of illustration and description and is not to be construed as defining the limits of the invention.

Figure 2:
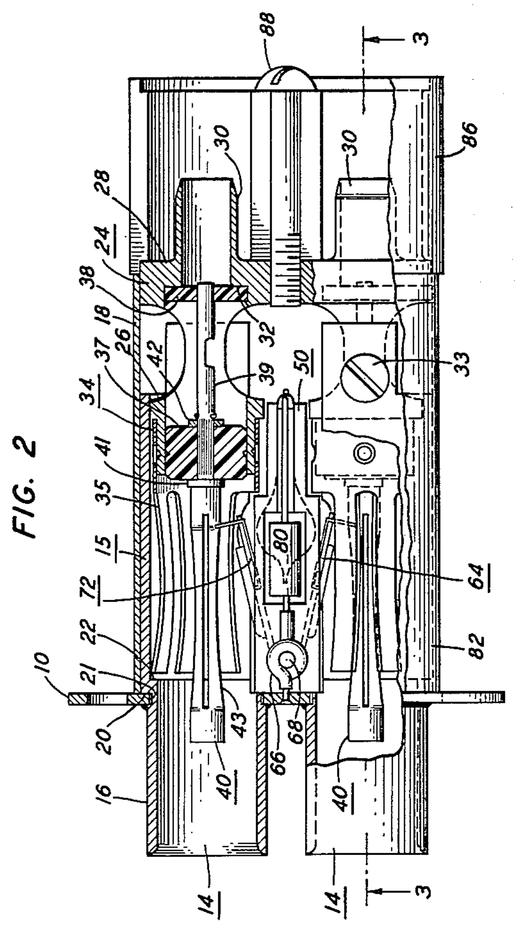
FIG. 2 is a plan view of the jack with parts broken away to show the interior structure.
Figure 3:
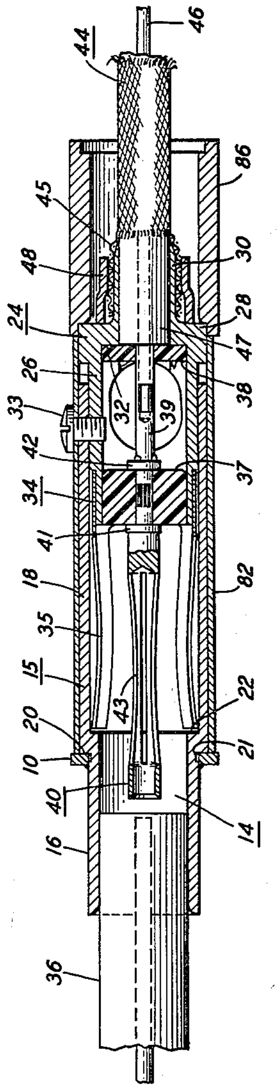
FIG. 3 is a sectional view of one of the sockets of the jack taken along line 3—3 of FIG. 2.
Figure 1:
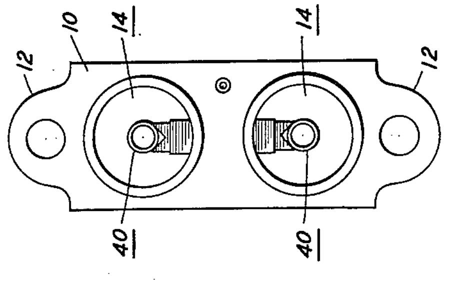
FIG. 1 is an end view of the coaxial jack of this invention.

Referring to the drawing and particularly to FIGS. 1, 2, and 3, the coaxial jack of this invention includes a metal mounting plate 10 that is adapted to be secured to the rear face of a jack mounting board (not shown) by means of fasteners (not shown) that pass through openings in semicircular lugs 12. In addition to the lug openings, the mounting plate 10 is provided with a pair of circular openings in which a pair of coaxial sockets 14 are mounted.

Each socket 14 includes a metallic sleeve 15 that is bi-diametral, the sleeve having a lesser diameter portion 16 positioned within one of the circular openings in the mounting plate 10 and extending forwardly therefrom and a greater diameter portion 18 extending rearwardly therefrom. An annular shoulder 20 formed at the juncture of the discontinuous outside surfaces abuts against the rear face of the mounting plate 10 and serves to properly locate the sleeve 15 with respect to the mounting plate. The sleeve is mechanically secured and electrically connected to the mounting plate by such means as intermittently staking the mounting plate into an annular groove 21 formed in the sleeve adjacent to the shoulder 20 and then soldering the sleeve to the plate. The juncture of the discontinuous inside surfaces occurs slightly to the rear of the juncture of the discontinuous outside surfaces and provides an internal shoulder 22.

Common to both sockets 14 is an electrically conductive support member 24, tubular contact securing portions 26 of the support member being respectively positioned within the rear ends of the sleeves 15. The support member also includes a web portion 28 and tubular cable securing portions 30. The contact securing portions 26 respectively extend along common longitudinal axes with the cable securing portions 30, and the openings therein are in communication. The cable securing portions 30 are of smaller diameter than the contact securing portions 26, and the juncture of the discontinuous inside surfaces provide internal shoulders 32. The support member 24 is mechanically secured and electrically connected to the sleeves 15 by a pair of fasteners 33, only one of which is shown.

As seen most clearly in FIG. 3, the contact securing portions 26 respectively include outside surfaces that are contiguous with the inside surfaces of the sleeves 15 and outside surfaces forward from the first-mentioned outside surfaces that are concentric with and spaced from the inside surfaces of the sleeves. The latter outside surfaces have the base ends of sleeve-like outer contact springs 34 disposed thereabout and secured thereto by such means as welding. The unsecured ends of the outer contact springs consist of arcuate spring fingers 35 that curve toward each other at their center and away from each other at their tips. The tips curve into concealment behind the internal shoulders 22 and thus when a coaxial plug 36, shown in FIG. 3, is inserted into one of the coaxial sockets 14, there is no danger of the plug catching one of the tips and damaging a spring finger 35. In addition, the plug is guided into engagement with the contact springs by the lesser diameter portions 16 of the sleeves 15. Facing segments of the greater diameter portions 18 of the sleeves 15 and the spring fingers 35 in juxtaposition therewith are removed for a purpose hereinafter explained.

Each tubular contact securing portion 26 of the tsupport member 24 receives washer-like insulators 37 and 38. The insulator 37 is positioned at the front end of the contact securing portion, while the insulator 38 is positioned contiguous with the internal shoulder 32. The insulators are secured in place by such means as staking.

The holes in each pair of insulators 37 and 38 accommodate a shank portion 39 of a sleeve-like inner contact spring 40, the insulators supporting the inner contact spring coaxial to the outer contact spring 34 disposed thereabout. A flange portion 41 of each inner contact spring 40 serves to properly locate the spring with respect to the insulators 37 and 38, and the diameter of the shank portion 39 is of a size to form a force fit with the insulator 37. The surface of the shank portion 39 contiguous with the insulator 37 may also be knurled to improve the frictional contact therebetween. Typically, each inner contact spring 40 is fixed in place by upsetting the surface of the shank portion 39 adjacent to a metal washer 42 abutting the rear surface of the insulator 37.

The forward end of each inner contact spring 40 is hollow and longitudinal slots are cut through the surface thereof. The segments remaining are bent so as to curve toward each other at their centers and away from each other at their ends, thereby providing flexible spring fingers 43 for making electrical connection with the inner contact of a coaxial plug. The front end of the inner contact springs extends forward of the outer contact springs, the inner springs extending into the lesser diameter portions 16 of the sleeves 15.

As shown in FIG. 3, each cable securing portion 30 of the support member 24 accommodates the end of a coaxial cable 44, shown in FIG. 3. The outer conductor 45 of the cable is positioned around the outside surface of the cable securing portion 30 and the inner conductor 46 of the cable and the insulation 47 thereabout are positioned within the cable securing portion. The outer conductor 45 of the cable is attached to the cable securing portion by crimping a ferrule 48 thereabout in the manner taught by Patent 2,798,113, issued on July 2, 1957, to Frederick W. Koller and Howard G. Tomer, and partially assigned to the assignee of this invention. The inner conductor 46 of the cable is, of course, insulated from the cable securing portion 30 by the cable insulation 47 and is attached to the shank portion 39 of an inner contact spring 40. A cavity in the shank portion receives the inner conductor 46, and it is soldered in place. Segments of both the shank portion 39 and the contact securing portion 26 of the support member 24 are removed to facilitate the soldering operation. Thus the inner conductor 46 of each coaxial cable 44 is connected directly to an inner contact spring 40, while the outer conductor 45 is connected to an outer contact spring 34 through the support member 24. It is to be noted that as the support member 24 is common to both outer contact springs 34 and to the outer conductors 45 of both cables 44, these elements are always interconnected. It is also to be noted that as the mounting plate 10 is electrically connected to the sleeves 15 and the sleeves are in turn electrically connected to the support member 24, the mounting plate is electrically connected to and therefore at the same potential as the outer conductors 45 of the coaxial cables 44.

Figure 4:
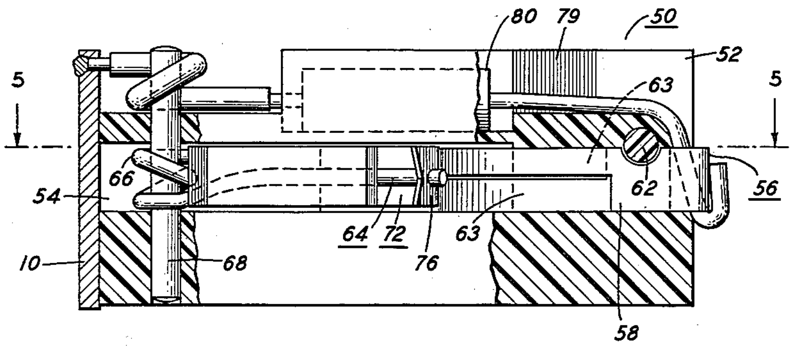
FIG. 4 is an enlarged side view of the switching assembly of the jack with parts broken away to show the interior structure.
Figure 5:
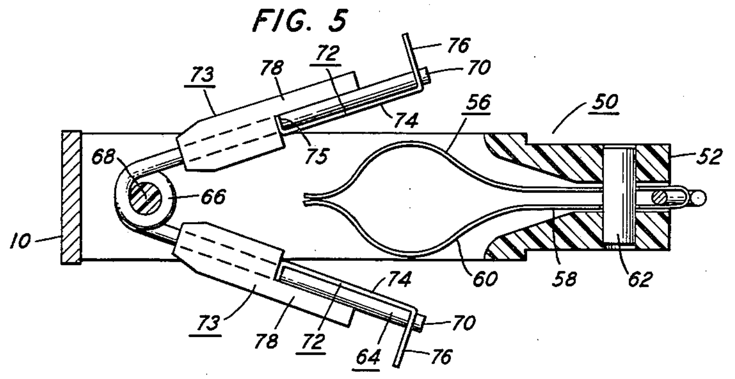
FIG. 5 is a sectional view taken along line 5—5 of FIG. 4.

Referring now to FIGS. 2, 4, and 5, positioned between the sockets 14 is a switching assembly 50. The switching assembly includes a dielectric block 52, the forward end of which abuts against the mounting plate 10 and the rearward end of which extends between the contact securing portions 26 of the support member 24. The block has a longitudinal slot 54 formed therein that provides a shelf in which is positioned a bulb-shaped flexible contact 56.

Figure 7:
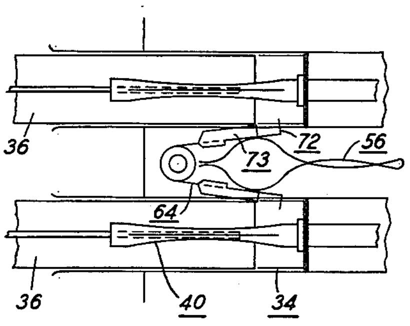
FIG. 7 is a schematic representation of the jack showing the operation of the switching assembly when coaxial plugs are inserted in both sockets.

The flexible contact 56 is essentially a leaf spring that is doubled back on itself, the spring being formed to provide a neck portion 58 and a bulbous portion 60. The spring is positioned within the slot 54 with the neck portion 58 in the rear end of the block 52 and the bulbous portion 60 extending forwardly therefrom. The height of the spring is approximately the same as that of the slot and therefore there is little or no up and down motion of the spring. In addition, the breadth of the slot narrows at the rear end of the block to approximately the same breadth as the neck portion 58, and thus lateral motion of the neck portion is prevented. Finally, a pin 62, which extends through a hole in the block transverse to the spring, cooperates with notches in the neck portion 58 to prevent longitudinal movement of the spring. The neck portion 58, however, may be compressed, as shown in FIG. 7, and staggered slots 63, visible in FIG. 4, are cut in the sides thereof to permit the sides to bypass one another when they are compressed.

Positioned in the slot 54, to the front of the flexible contact 56, is a U-shaped wire spring 64. A base portion 66 of the wire spring 64 is coiled about a dielectric pin 68 mounted in the forward end of the block 52. The coils of the base portion 66 are spaced from one another so that there is no electrical short therebetween. Arms 70 of the wire spring extend rearwardly and divergently from the base portion 66, the arms lying on either side of the bulbous portion 60 of the flexible contact 56. A contact 72 and an insulator 73 are mounted on each of the arms 70.

Each contact 72 comprises a metal ribbon, the center portion 74 of which extends along its associated arm 70 on the side of the arm in juxtaposition with the flexible contact 56 and the ends of which extend normal to the arm and away from the flexible contact. The forward end 75 of each ribbon contact has a square notch into which the arm seats and the rearward end 76 has a hole through which the arm extends. The rearward end 76 terminates in a V-shaped contacting surface. Each contact 72 is secured to its associated wire spring arm 70 as by solder.

The insulators 73 are essentially rectangular bars, portions of which are removed to accommodate the forward portions of the contacts 72. The forward portion of each insulator has a longitudinal hole through which the associated arm 70 of the wire spring 64 extends, the insulator being positioned on the arm with a finger portion 78 of the insulator extending along the arm on the side of the arm in juxtaposition with the socket 14 adjacent thereto. Each insulator is captured between the adjacent contact 72 and the base portion 66 of the wire spring 64, and is prevented from rotating about its axis by the engagement of the finger portion 78 thereof with forward end 75 of the contact.

The arms 70 of the wire spring 64 are biased away from one another and since, as hereinbefore mentioned, the facing segments of the greater diameter portions 18 of the sleeves 15 and the spring fingers 35 of the outer contact springs 34 in juxtaposition therewith are removed, the bias of the arms normally moves the V-shaped contacting surface of the rearward ends 76 of the contacts 72 into engagement with the inner contact springs 40 and thereby interconnects them. The V-shaped contacting surfaces serve to center the contacts 72 against the inner contact springs 40 and provide two-point contact therebetween.

In addition to the slot 54, the block 52 includes a longitudinal recess in the upper surface thereof, as viewed in FIG. 4. A resistor 80 is positioned in the recess with the leads of the resistor extending along the longitudinal axis of the block. One lead of the resistor is electrically secured to the neck portion 58 of the flexible contact 56 while the other lead is looped around the pin 68 and electrically connected to the mounting plate 10 as by soldering. The latter lead is insulated so that there is no electrical short between the turns of the loop. The resistor 80 is selected to provide a resistance that matches the characteristic impedance of the coaxial cable 44 to which the sockets 14 are connected.

Turning again to FIGS. 2 and 3, the switching assembly 50 and the major portion of the sockets 14 are enclosed within an oval cover 82, the cover being held in place by the fastener 33. The rear ends of the sockets are enclosed by a guard member 86. The guard member includes twin bores that respectively accommodate the cable securing portions 30 of the support member 24 and the ends of the cables 44 secured thereto. The guard is held in place by a screw 88 that is threaded into the web portion 28 of the support member.

*Operation of the Coaxial Jack*

Referring to FIGS. 2, 3, and 5, when no plugs are inserted in either of the sockets 14, the bias of the arms 70 of the wire spring 64 move the rearward ends 76 of the contacts 72 into engagement with the inner contact springs 40. As the inner contact springs 40 are respectively adapted to be connected to the inner conductors 46 of the coaxial cables 44, the action of the wire spring 64 provides a conductive path from the inner conductor 46 of one coaxial cable 44 through the inner contact spring 40 to which the inner conductor is secured, through the contact 72 engaging the inner contact spring, through the wire spring arm 70 to which the contact is secured, through the turns of the wire spring base portion 66, through the other wire spring arm 70, through the contact 72 secured thereto, and through the other inner contact spring 40 to the inner conductor 46 to which it is connected. The support member 24 is adapted to have both of the outer conductors 45 of the coaxial cables 44 connected thereto and thus the outer conductors 45 are always electrically connected to one another. It is, therefore, seen that the interconnection of the inner contact springs 40 provides a coaxial connection between the coaxial cables 44. The turns of the base portion 66 of the wire spring 64 are designed to introduce into this coaxial connection a series inductance that substantially compensates for the mismatch between the impedance of the connection and the characteristic impedance of the coaxial cables to which the jack is connected, the impedance mismatch being caused by the capacitance of the portions of the inner contact springs 40 (forward of the points of engagement of the contacts 72) and other parasitic capacitance.

Figure 6:
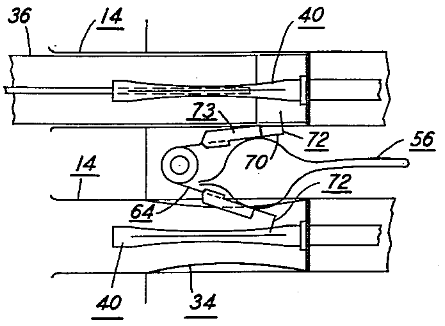
FIG. 6 is a schematic representation of the jack showing the operation of the switching assembly when a coaxial plug is inserted in one of the sockets.

Turning now also to FIG. 6, when a coaxial plug 36 is inserted into either one of the sockets 14, the outer and inner contacts of the plug initially engage the outer and inner contact springs 34 and 40 of the socket 14 into which the plug is inserted. A connection is thereby immediately established between the cable secured to this socket and the cable secured to the plug. Further insertion of the plug brings the outer contact of the plug into engagement with the insulator 73 mounted on the wire spring arm 70 extending into this socket. The continued insertion of the plug acts to move this wire spring arm 70 out of the socket, and the rearward end 76 of the contact 72 secured to this arm is thus moved out of engagement with the inner contact spring 40 of the socket. The electrical connection between the cables respectively secured to the sockets 14 of the jack is thereby interrupted.

As the wire spring arm 70 is moved further out of the socket 14 by the further insertion of the coaxial plug 36 into the socket, the center portion 74 of the contact 72 secured to the arm engages and commences to laterally deflect the bulbous portion 60 of the flexible contact 56. At this point there is an electrical path established from the inner conductor 46 of the coaxial cable 44 connected to the socket 14 into which no plug is inserted, through the inner contact spring 40 of this socket, through the contact 72 engaging this inner contact spring, through the wire spring arm 70 to which the contact is secured, through the turns of the wire spring base portion 66, through the other wire spring arm 70, through the contact 72 secured thereto, through the flexible contact 56, through the resistor 80, and through the turn in the lead thereof to the mounting plate 10. As the resistance of the resistor 80 is the same as the characteristic impedance of the coaxial cables and as the mounting plate is at the same potential as the outer conductors of the coaxial cables, the cable 44 connected to the socket 14 into which no plug is inserted is terminated. In this electrical path, however, there is series inductance provided by both the turns in the wire spring base portion 66 and the turn in the lead of the resistor 80. The series inductance provided thereby is more than is necessary to compensate for the mismatch between the impedance of the termination and the characteristic impedance of the terminated coaxial cable, the impedance mismatch being caused by the capacitance of the forward portion of the inner contact spring 40 of the terminated socket 14 and other parasitic capacitance.

Thus when the coaxial plug 36 is inserted to its full depth, the bulbous portion 60 of the flexible contact 56 is deflected into engagement with the center portion 74 of the contact 72 engaging the inner contact spring 40 of the socket 14 into which no plug is inserted. An electrical path is thereby established from the inner conductor 46 of the coaxial cable 44 secured to the inner contact spring 40 of the socket 14 into which no plug is inserted, through the inner contact spring 40, through the contact 72 in engagement therewith, through the flexible contact 56, through the resistor 80, and through the turn in the lead thereof to the mounting plate 10. This electrical path includes the turn in the resistor 80, but eliminates the turns in the wire spring base portion 66. The series inductance provided by the turns in the resistor is sufficient by itself to compensate for the impedance mismatch.

Should a coaxial plug 36 be subsequently inserted, as shown in FIG. 7, into the socket 14 to which the terminated coaxial cable 44 is connected, the outer and inner contacts of the plug respectively intially make electrical contact with the outer and inner contact springs 34 and 40 of the socket. A connection is thus established between the terminated cable and the cable secured to the plug. Further insertion of the plug then deflects the wire spring arm 70 extending into the socket away from the inner contact spring 40 and thereby disconnects the coaxial cable from its termination.

When a plug pair is inserted in to the sockets 14, the pair initially connects the cables secured thereto to the cables secured to the respective sockets and then deflects both arms 70 of the wire spring 64 away from their respective inner contact springs 40. All internal switching is thereby disconnected.

Although the coaxial jack as described provides a termination for one socket when a coaxial plug is inserted into the other socket, there may be applications where the termination is unnecessary, and in this situation the resistor would be left out. Furthermore, it may be desirable in some applications to provide a third socket, alongside of the two described, to act as a monitor. The inner contact spring of the third socket would then be electrically connected through a capacitor to the inner contact spring of the adjacent socket, the outer contact springs being interconnected by a common support member. These and other modifications are within the spirit and scope of the invention as set forth in the following claims.

What is claimed is:

1. In a coaxial connector comprising a pair of spaced coaxial sockets, each socket being adapted to receive a coaxial plug and each socket including an outer conductor electrically insulated from an inner conductor, the outer and inner conductors of each socket being respectively connectable to the outer and inner conductors of a coaxial cable and being respectively engaged by the outer and inner conductors of a coaxial plug upon the insertion of the plug into the socket, the combination therewith of means for electrically interconnecting the sockets, the interconnecting means comprising a first conductive means providing a conductive path between the outer conductors of the sockets, a second conductive means insulated from the first conductive means and adapted to provide a conductive path between the inner conductors of the sockets, the second conductive means normally engaging the inner conductors of both sockets, and a terminating means including a resistance of the same magnitude as the characteristic impedance of the coaxial cables to which the connector is to be secured, the terminating means being electrically connected to the outer conductors of both sockets, the insertion of a coaxial plug in one of the sockets connecting the outer and inner conductors of the plug to the outer and inner conductors of the socket, disengaging the second conductive means from the inner conductor of that socket, and actuating the second conductive means into electrical contact with the terminating means, thereby providing a termination for the socket into which no plug is inserted.

2. A coaxial connector as in claim 1 wherein the interconnecting means includes an inductance of a magnitude to substantially compensate for the mismatch between the impedance of the first and second conductive means and the characteristic impedance of the coaxial cables to which the connector is to be secured.

3. A coaxial connector as in claim 2 wherein the terminating means includes an inductance of a magnitude to substantially compensate for the mismatch between the impedance of the terminating means and the characteristic impedance of the coaxial cables to which the connector is to be secured.

4. In a coaxial jack comprising a pair of spaced coaxial sockets, each socket being adapted to receive a coaxial plug, and each socket including an outer contact disposed about and electrically insulated from an inner contact, the outer and inner contacts of each socket being respectively connectable to the outer and inner conductors of a coaxial cable and being respectively engaged by the outer and inner contacts of a coaxial plug upon the insertion of the plug in the socket, the combination therewith of means for interconnecting the sockets, the interconnecting means comprising a conductive member common to the outer contacts of both sockets and a U-shaped spring member electrically insulated from the conductive member, the spring member being positioned intermediate the sockets and having contacts respectively secured to the arms thereof, each arm normally extending into the socket adjacent thereto and biasing the contact secured thereto into engagement with the inner contact of the socket, whereby a coaxial connection is provided between the sockets, the insertion of a coaxial plug into either one of the sockets connecting the outer and inner contacts of the plug to the outer and inner contacts of the socket and actuating the spring member to disengage the contact thereof from the inner contact of the socket into which the plug is inserted.

5. A coaxial jack as in claim 4 further including an insulator mounted on each arm of the spring member, the insertion of a coaxial plug in either one of the sockets after connecting the respective contacts of the plug to the respective contacts of the socket engaging the insulator mounted on the spring member arm extending into the socket and displacing the spring member arm away from the inner contact of the socket, thereby interrupting the coaxial connection between the sockets.

6. A coaxial jack as in claim 4 wherein the base portion of the spring member joining the arms is coiled, the coils providing an inductance that approximately compensates for the mismatch between the impedance of the interconnecting means nad the characteristic impedance of the coaxial cables to which the jack is to be secured.

7. A coaxial jack as in claim 4 further including a flexible contact extending intermediate the arms of the spring member, the flexible contact being connected through a resistance element to the outer contacts of both sockets, the resistance element having the same resistance as the characteristic impedance of the coaxial cables to which the jack is to be secured, the displacement of a spring member arm by the insertion of a plug into one of the sockets causing the arm in turn to displace the flexible contact into electrical engagement with the contact secured to the spring member arm extending into the socket into which no plug is inserted, and thereby providing a termination for the socket into which no plug is inserted.

8. A coaxial jack as in claim 7 wherein the flexible contact comprises a bulb-shaped cantilever spring having a fixed neck portion and a flexible bulbous portion.

9. A coaxial jack as in claim 7 wherein the spring member, flexible contact, and resistance element are all mounted in a dielectric block positioned between the sockets.

10. A coaxial jack as in claim 7 wherein one of the leads of the resistance element is coiled, the coils providing an inductance that compensates for the mismatch between the impedance of the termination and the characteristic impedance of the coaxial cables to which the jack is to be secured.

References Cited in the file of this patent

UNITED STATES PATENTS 2,846,653 Lanctot ---------------- Aug. 5, 1958